United States Patent
Palatnik

[11] Patent Number: 5,615,091
[45] Date of Patent: Mar. 25, 1997

[54] ISOLATION TRANSFORMER FOR MEDICAL EQUIPMENT

[75] Inventor: Eugene S. Palatnik, Pewaukee, Wis.

[73] Assignee: Biochem International, Inc., Waukesha, Wis.

[21] Appl. No.: 541,074

[22] Filed: Oct. 11, 1995

[51] Int. Cl.$^6$ .......................... H02M 3/337; H01F 27/34
[52] U.S. Cl. ............................................ 363/17; 336/198
[58] Field of Search ............................... 363/17, 24, 25; 336/198, 206

[56] References Cited

U.S. PATENT DOCUMENTS

| | | | |
|---|---|---|---|
| 3,691,425 | 9/1972 | Weyrich et al. | 361/41 |
| 3,896,407 | 7/1975 | Long | 336/198 |
| 3,947,795 | 3/1976 | Donnelly et al. | 336/198 |
| 4,188,574 | 2/1980 | Allington | 324/509 |
| 4,405,913 | 9/1983 | Finkbeiner | 336/98 |
| 4,717,889 | 1/1988 | Engelmann | 363/17 |
| 5,053,937 | 10/1991 | Blockl | 363/17 |

Primary Examiner—Peter S. Wong
Assistant Examiner—Derek J. Jardieu
Attorney, Agent, or Firm—Quarles & Brady

[57] ABSTRACT

A power supply has a transformer for isolating circuitry to which power is furnished from the electrical supply lines. The transformer includes a core of ferro-magnetic material with primary and secondary windings wound side-by-side on the core. The primary winding has two layers of turns with a center tap formed at a connection of the turns of each layer that are closest to the secondary winding. Similarly, the secondary winding has two layers of turns with a center tap formed at a connection of the turns of each layer which are closest to the primary winding. A driver applies excitation voltage across the center tap, which also is coupled to earth ground, and a turn of the innermost primary winding layer. The center tap of the secondary winding is used as an isolated ground and a supply voltage is produced between two turns from different layers of the secondary winding. Because the ground connection of each winding is made a turns that are closest to the other winding, the parasitic capacitance is the greatest between those turns which minimizes any difference in potential between the earth ground and the isolated ground.

9 Claims, 2 Drawing Sheets

ISOLATION TRANSFORMER FOR MEDICAL EQUIPMENT

BACKGROUND OF THE INVENTION

The present invention relates to transformers which provide isolation between two electrical circuits; and more particularly to transformers which isolate medical equipment connected to a patient from a source of relatively high voltage that powers the equipment.

Many types of medical equipment, such as temperature monitors, electrocardiograms, oximeters, or invasive blood pressure monitors, include sensors which are in contact with the patient. Although the sensors operate at relatively low voltage and current levels that do not present a shock hazard to the patient, that hazard can occur if high voltage from a supply line powering the equipment is applied to the sensor due to failure of the equipment's internal power supply. As a consequence, the U.S. Food and Drug Administration, which regulates medical equipment, has prescribed rules specifying the degree of electrical isolation required between components that contact the patient and the electrical supply lines.

The isolation requirement typically is satisfied by supplying power through an transformer. An exemplary medical apparatus 10, schematically illustrated in FIG. 1, has a non-isolated section 12 containing a power supply driver 14 which is connected via plug 16 to 120 or 240 volt alternating current supply lines in a building. The apparatus 10 also has circuitry in an isolated section 18 which includes a DC power supply 20 and components that sense and process biological function data. For example, a bio-amplifier 22 is connected by a cable 24 to sensors on medical patient 26. The processing components, such as bio-amplifier 22, may supply signals to other circuits and display devices in the non-isolated section 12 via optically isolated conductors (not shown).

The electricity for the isolated section 18 is supplied from driver 14 through an isolation transformer 28 to the DC power supply 20. The U.S. Food and Drug Administration has specified that the transformer, as well as other components which form the isolation barrier between the two apparatus sections 12 and 18 must be able to withstand a four kilovolt AC breakdown voltage with leakage current of ten microamperes or less when the supply line voltage is applied across the isolation barrier.

In common medical apparatus, the driver applies a high frequency excitation signal of 100–500 kHz to the transformer primary winding and harmonics of the excitation signal may be in the radio frequency spectrum. Other regulations specify the amount of electromagnetic interference (EMI) which the medical apparatus may radiate in the radio frequency (RF) spectrum. Those regulations also affect the design of the isolated power supply when the driver 14 applies a high frequency excitation signal to the primary winding of the transformer 28.

FIGS. 2 and 3 portray a typical isolation transformer utilized in previous medical equipment. The transformer comprises a solid ferrite core 30 with a central leg 32 passing through the aperture in an annular bobbin 34. The primary and secondary windings 36 and 38 are wound around the bobbin 34 and thus around the center leg 32 of the core 30. As shown in FIG. 3, the primary winding 36 comprises two layers of turns wound on the bobbin adjacent the center leg 32 of the transformer core with plastic tape 40 therebetween. Additional plastic tape 41 is wrapped around the outer periphery of the primary winding 36. The secondary winding 38 also is formed by two layers of turns with plastic tape 42 there between. The earth ground 17 (FIG. 1) is connected to the first turn 43 of the primary winding 36 and the isolated ground 23 in the isolated section 18 is connected to the first turn 44 of the secondary winding 38. For ease of illustration, the primary and secondary windings are being shown with each one having only two layers of turns. Normally this type of transformer has many more layers in each winding which further increases the problem described hereafter.

The instantaneous voltage per turn (Vturn) is the same for the primary and the secondary windings 36 and 38. In this arrangement, parasitic capacitances exist between adjacent turns of the second layer in primary winding 36 and the first layer within secondary winding 38. At any instant in time, the first turn 46 of the second layer in primary winding 36 has a potential n*(Vturn) with reference to the earth, or non-isolated, ground where n is the number of turns in one layer (e.g. nine). The second turn in the primary winding second layer has a potential given by [n*(Vturn)]+Vturn, the third turn potential is [n*(Vturn)]+[2*(Vturn)], and so on. The numbers within each circular representation of a conductor in FIG. 2 designate the voltage in each turn when Vturn equals one. The first turn 44 of the first layer in secondary winding 38 at the same instant in time has a potential of zero volts with reference to the isolated ground. The second turn in this layer of the secondary winding has a potential of Vturn, the third winding turn has a potential of 2*(Vturn), and so on. As is apparent, at any instant in time, there is a difference of potential of n*(Vturn) between adjacent turns in abutting layers of the primary and secondary windings.

As a result of this transformer configuration, a voltage Vgg is generated between the non-isolated and isolated grounds and is applied to the sensor cable 24. As a consequence a pulsatile current, due to high frequency excitation of the parasitic transformer capacitance, flows through the cable 24, patient 26 and then to earth ground through additional parasitic capacitance 27 between the patient and earth ground. The pulsatile current also is partially radiated as electromagnetic energy. This current then returns to the non-isolated section 12 through the earth ground connection 17.

Several problems are associated with this parasitic high frequency current. Such current flowing from the patient 26 to ground can mislead front end sensor signal processing components in the medical apparatus. In addition, common mode current flowing through sensitive electronics in the isolated section 18 can generate voltage drops on the ground conductor which also mislead amplifiers and other components. Further, the parasitic high frequency current may result in excessive electromagnetic interference because the apparatus acts as a RF transmitter with a resonant frequency defined by the length of the patient cable 24 and the sensor probes.

A possible solution to these problems involves bypassing the common mode voltage source presented by the transformer with a capacitor Cbp, designated 29 in FIG. 1. Ignoring impedance due to parasitic patient capacitance 27 and the radiated energy, the voltage Vgg between the two grounds is defined as:

$$Vgg = \frac{Vcm * Zbp}{Zbp + Zcomm}$$

where Zbp equals $1/(\omega Cbp)$ and is the impedance of the bypass capacitor at excitation frequency $\omega$, Zcomm is the impedance of the transformer's parasitic capacitance at the excitation frequency, and Vcm=n*(Vturn). Hence:

$$V_{gg} = \frac{V_{cm}}{1 + \frac{C_{bp}}{C_{comm}}}$$

This relationship indicates that in order to reduce the inter-ground voltage Vgg, the bypass capacitance Cbp must be relatively large. However, as the bypass capacitance increases, the leakage current increases and often rises above acceptable limits. Therefore, another solution is dictated.

SUMMARY OF THE INVENTION

A general object of the present invention is to provide a transformer for isolating circuits in different sections of a piece of medical equipment.

Another object is to provide an isolation transformer which has significant parasitic capacitance between ground connections to the primary and secondary windings and reduced parasitic capacitance between other portions of those windings.

A further aspect of the present invention is to utilize such an isolation transformer in a power supply so that a voltage difference between earth ground and an isolated circuit ground is minimized because positive and negative voltage components are in equilibrium.

These and other objects are satisfied by an isolation transformer that includes a core of ferro-magnetic material about which primary and secondary windings are wound side by side. The primary winding has a first layer formed by a plurality of turns wound around the core with an exterior turn being adjacent a first edge of the primary winding and an interior turn being adjacent an opposing second edge. A second layer of the primary winding has a plurality of turns wound around the first layer and includes an exterior turn adjacent the first edge and an interior turn adjacent the second edge. The interior turn of the first layer is connected at a first point to the interior turn of the second layer thus forming a center tap.

The secondary winding, with third and fourth edges, is located on the core to one side of the primary winding with the third edge facing the second edge. The secondary winding has third layer formed by a plurality of turns wound around the core with an exterior turn adjacent the fourth edge and an interior turn adjacent the third edge. A fourth layer, which is part of the secondary winding has a plurality of turns wound around the third layer and includes an exterior turn that is adjacent the fourth edge and an interior turn that is adjacent the third edge. The interior turns of the third and fourth layers are electrically connected at a second point that forms a center tap.

A first terminal of the isolation transformer is coupled preferably to the exterior turn of the first layer, but alternatively can be connected to the exterior turn of the second layer. A second terminal is connected to the first point. A third terminal connects to the exterior turn of the third layer, and a fourth terminal is connected to the second point. A fifth terminal connects to the exterior turn of the fourth layer.

A power supply incorporating this isolation transformer also is described. The power supply includes a driver that applies an alternating excitation signal, typically at a high frequency, to the first terminal therby causing current to flow through the transformer primary winding to the second terminal. The other exterior turn of the primary winding which is not attached to the first terminal is not connected to other power supply components. The power supply further includes an isolated circuit, which has an isolated ground at the fourth terminal of the transformer. The isolated circuit typically has a rectifier connected to the third and fifth terminals of the transformer to produce a DC supply voltage.

In this configuration of the isolation transformer, the primary and secondary windings are symmetrical with respect to each other about a plane between the two windings. As a consequence, the grounded turns in each winding are next to each other and the voltage difference between corresponding turns in each winding is minimal. Because the layers of each winding are wound in opposite directions, the effects of the parasitic capacitances are equalized, thus providing first order compensation of the negative and positive common mode voltage components. The parasitic capacitance between grounded turns of the primary and secondary windings is relatively large contributing to the bypass impedance, thus allowing use of external bypass capacitance having a value that maintains leakage current within acceptable limits.

DETAILED DESCRIPTION OF THE INVENTION

Figure 1:
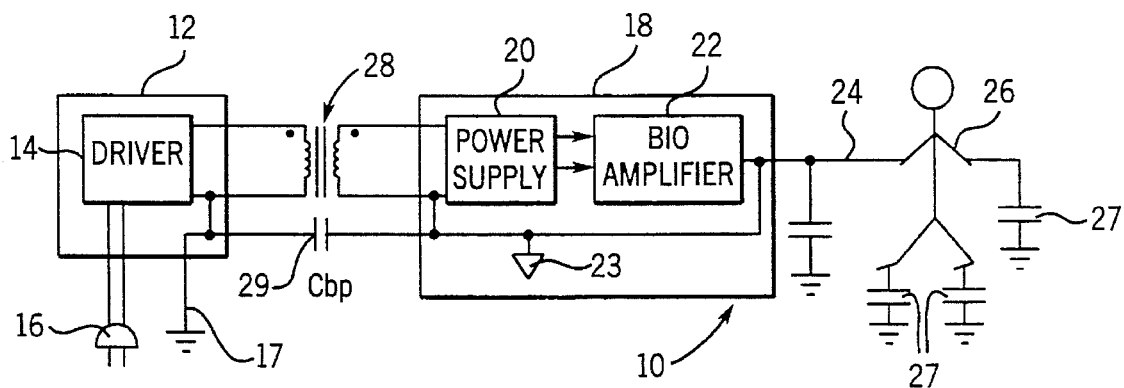
FIG. 1 is a schematic diagram of a prior art power supply in an electronic medical apparatus, such as an electrocardiogram, an oximeter, temperature probe, or invasive blood pressure probe.
Figure 2:
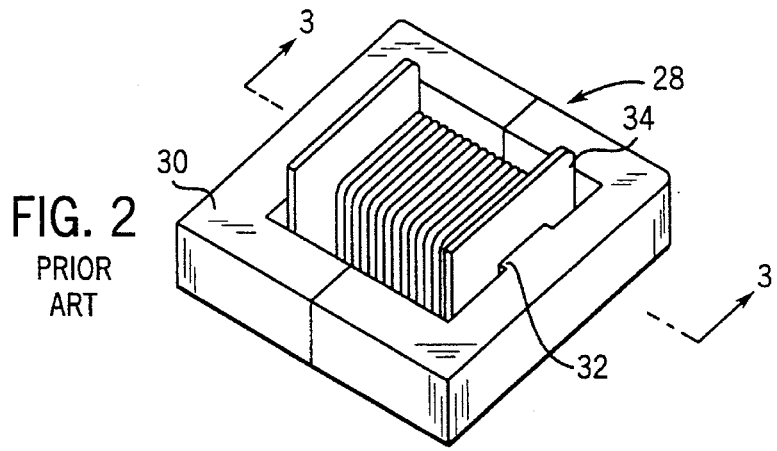
FIG. 2 is an isometric drawing of the transformer used in the prior art power supply.
Figure 3:
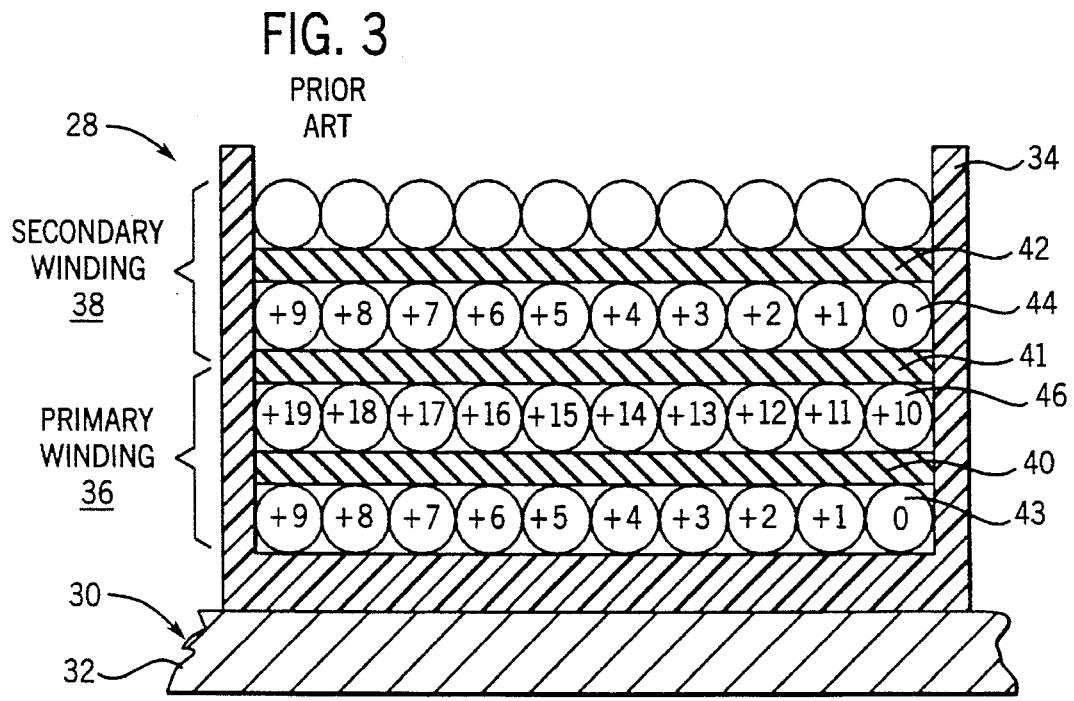
FIG. 3 is a cross-sectional view along line 3—3 in FIG. 2.
Figure 4:
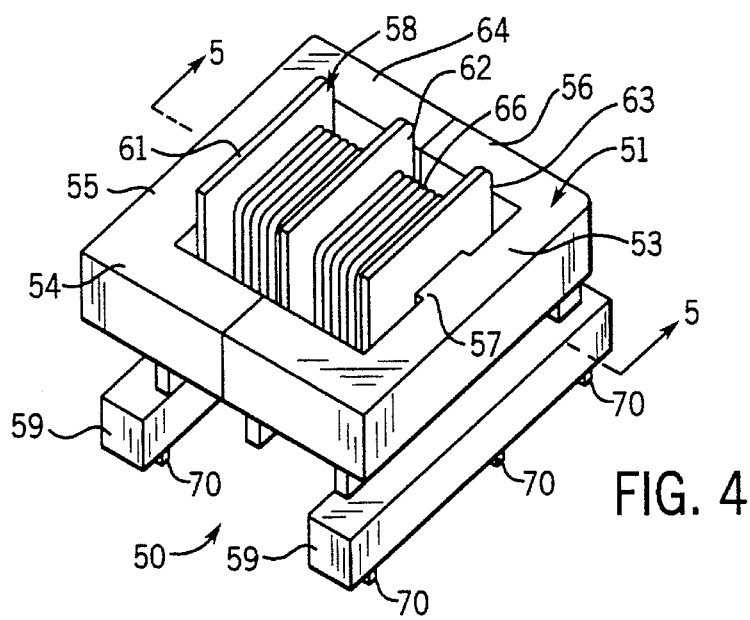
FIG. 4 is an isometric drawing of a transformer according to the present invention.

With reference to FIG. 4, a transformer 50 according to the present invention comprises a core 51 formed of a ferromagnetic material commonly used in transformer cores. The core 51 has an annular, square shape with four sides 53, 54, 55 and 56 and a center leg 57 extending between two opposing sides 53 and 55. A dual bobbin 58 of plastic or another non-magnetic material has a tube 60, visible in FIG. 5, with a central longitudinal opening through which the center leg 57 of the core 51 extends. Three external walls 61, 62, and 63 are spaced along the length of the tube and extend there around, thereby creating a pair of annular troughs between adjacent walls 61–63 for receiving the transformer windings. The two outer walls 61 and 63 are attached to members 59 which form a base for mounting the transformer 50.

A primary winding 64 is wound around the bobbin tube 60 in the trough between walls 61 and 62. The secondary winding 66 is wound around the bobbin tube 60 in the other trough formed between walls 62 and 63. Thus, the primary and secondary windings of transformer 50 are wound next to each other rather than over one another as in previous isolation transformers. That side-by-side configuration reduces the parasitic capacitance between these windings and provides first order compensation of the negative and positive common mode voltage components, as will be described.

Figure 5:
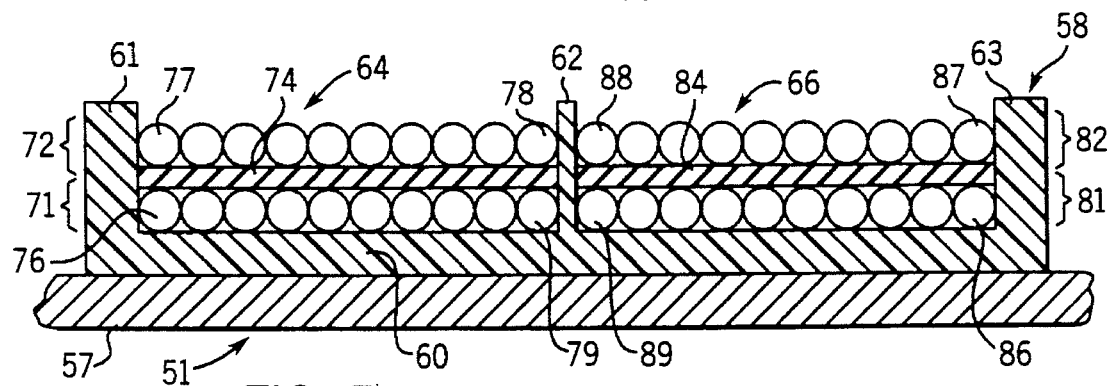
FIG. 5 is a cross-sectional view along line 5—5 in FIG. 4.

Referring to FIG. 5, the primary winding 64 comprises two layers 71 and 72, each of which form one-half of the primary winding. Layers 71 and 72 have the same number of turns, but are wound in opposite directions on the bobbin 58 with edges of the primary winding abutting walls 61 and 62. Specifically, the first layer 71 is wound from the outside wall 61 toward the center wall 62 and then the second layer is wound going from the center wall 62 to the outer wall 61 with a sheet of plastic tape insulation 74 between the two layers. Thus, exterior turn 76 at the outer edge of the first layer is at one end of the primary winding 64, while the exterior turn 77 on the second layer 72 is at the other end of the primary winding. The interior turns 78 and 79 which are against the center wall 62 in each layer are middle turns of the primary winding 64 and are connected to a center tap 73 conductor leading therefrom. The two exterior turns 76 and 77 and the center tap conductor extend to connector leads 70 on one of the base members 59 shown in FIG. 4.

The secondary winding 66 is wound on the bobbin 58 in a similar manner with edges abutting walls 62 and 63. In particular, the secondary winding has two layers, 81 and 82, with equal numbers of turns so that each layer forms one-half the secondary winding. As with the primary winding, the two secondary layers 81 and 82 are wound in opposite directions. Specifically, the first layer 81 has an exterior turn 86 against the outer wall 63 and is wound with successive turns going toward the center wall 62 with an interior turn 89 of that first layer abutting the center wall 62. The second layer 82 is wound from an interior turn 88 against the center wall and then goes outward terminating in an exterior turn 87 against the outer wall 63. The two layers 81 and 82 have plastic tape 84 therebetween. The two interior turns 88 and 89 of each secondary winding layer are connected to a center tap conductor 75. The two exterior turns 86 and 87 are at opposite ends of the secondary winding 66. The center tap conductor 75 and the exterior turns 86 and 87 of each layer of the secondary winding 66, extend to separate connector leads 70 at the other base member 59 shown in FIG. 4.

Although the present invention is described in the context of an isolation transformer in which the primary and secondary windings 64 and 66 have equal numbers of turns, the concept of the invention for reducing an inter-ground voltage difference can be applied to transformers in which the primary and secondary windings have unequal numbers of turns.

Figure 6:
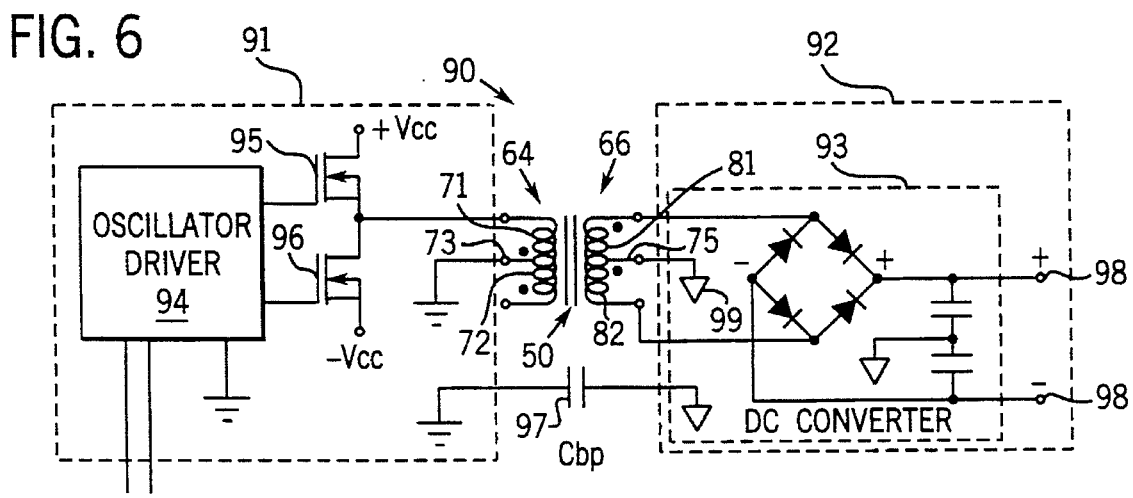
FIG. 6 is a schematic diagram of a medical apparatus power supply that incorporates the transformer of FIG. 4.

FIG. 6 schematically illustrates a medical apparatus 90 having a non-isolated circuit portion 91 and an isolated circuit portion 92 which are coupled by transformer 50. The non-isolated portion 91 has an oscillator/driver 94 which receives power from the supply lines to which the medical device is connected. The oscillator/driver 94 produces two high frequency (e.g. 100 to 500 Khz) signals of the same frequency, but 180 degrees out of phase. The high frequency signals are applied to the gates of two power field effect transistors 95 and 96 which have source-drain conduction paths connected in series between sources of positive and negative DC potential +Vcc and −Vcc. The two power field effect transistors 95 and 96 are driven in a push-pull configuration and control the application of positive and negative supply voltage to the transformer 50 via connection of an intermediate node between transistors 95 to the exterior turn 76 in the inner layer 71 of primary winding 64. The center tap 73 of the primary winding 64 at the connection point between interior turns 78 and 79 is connected to the non-isolated, or earth, ground. The other exterior turn 77 in the outer layer 72 of the primary winding is left unconnected without current flowing therethrough, as the only function of that half, or layer, of primary winding 64 is to ensure symmetry between with respect to the secondary winding 66. As an alternative, the excitation signal produced at the intermediate node between transistors 95 could be applied to the exterior turn 77 in the outer layer 72 of primary winding 64, in which case the exterior turn 76 in the inner layer 71 is unconnected in the power supply.

The secondary winding 66 of transformer 50 has a center tap 75 at an attachment point between interior turns 88 and 89, which is connected to the isolated ground 99 within circuit portion 92. The exterior turns 86 and 87 of the secondary winding 66 are connected to a full-wave bridge rectifier within the DC power supply 93 which produces a DC voltage between terminals 98 for powering circuitry in the isolated portion 92.

The primary and secondary windings 64 and 66 have both physical and electrical symmetry about the center wall 62 of bobbin 58. By locating the ground connections of the primary and secondary windings 64 and 66 close to the symmetrical center of the dual bobbin 58, the zero potential (interior) turns of both windings are next to one another. This creates the highest capacitance between the ground points on each winding with capacitance between turns having greater potential gradually degrading going away from the center wall 62 of the bobbin 58. Primary winding exterior turn 76, which is closest to the end wall 61 of the bobbin, has the highest potential, but the lowest parasitic capacitance with respect to the secondary winding 66. Because the layers of each winding 64 and 66 are wound in opposite directions, the effects of the parasitic capacitances are equalized, thus providing first order compensation of the negative and positive common mode voltage components.

Creating the highest parasitic capacitance between ground points on each winding provides intrinsic bypass capacitance. This enables the use of a relatively low valued external bypass capacitor 97 (Cbp) which for example has a value of 47 picofarads or less. The use of such a low valued external bypass capacitor 97 reduces the leakage current, occurring between the to circuit portions 91 and 92 during a fault condition, to within acceptable limits.

I claim:

1. An isolation power supply comprising:
   isolation transformer including:
   (a) a core of ferro-magnetic material,
   (b) a primary winding with a first edge and a second edge, and having a first layer formed by a plurality of turns wound around said core with an exterior turn adjacent the first edge and an interior turn adjacent the second edge, said primary winding further having a second layer formed by a plurality of turns wound around the first layer with an exterior turn adjacent the first edge and an interior turn adjacent the second edge, wherein the interior turn of the first layer is electrically connected at a first point to the interior turn of the second layer, and
   (c) a secondary winding with a third edge and a fourth edge, and located on said core to one side of the primary winding with the third edge facing the second edge, said secondary winding having a third layer formed by a plurality of turns wound around said core with an exterior turn adjacent the fourth edge and an interior turn adjacent the third edge, said secondary winding further having a fourth layer formed by a plurality of turns wound around the third layer with an exterior turn adjacent the fourth edge and an interior turn adjacent the third edge, wherein the interior turn of the third layer is electrically connected at a second point to the interior turn of the fourth layer;

a transformer driver circuit which applies an alternating signal between the first point and one of the exterior turn of the first layer and the exterior turn of the second layer, wherein the other exterior turn is unconnected; and an isolated circuit wherein having an isolated ground to which the second point is connected and utilizing a voltage produced between the exterior turn of the third layer and the exterior turn of the fourth layer.

2. The isolation power supply as recited in claim 1 wherein said transformer driver comprises:

an oscillator which produces first and second excitation signals; and a pair of power transistors having conduction paths connected in series between a source of a DC potential with a node formed between said pair of power transistors, the node being connected to the one exterior turn of the primary winding, each one of said pair of power transistors having a control electrode to which one of the first and second excitation signals is applied, thereby operating said pair of power transistors in a push-pull manner.

3. The isolation power supply as recited in claim 2 wherein the first and second excitation signals have a frequency in the range of 100 to 500 kilohertz.

4. The isolation power supply as recited in claim 1 wherein the first point is connected to earth ground.

5. The isolation power supply as recited in claim 3 further comprising a capacitor connected between earth ground and the isolated ground.

6. The isolation power supply as recited in claim 4 wherein the capacitor has a value of no greater than 47 picofarads.

7. The transformer as recited in claim 1 wherein the first layer and the second layer have equal numbers of turns.

8. The transformer as recited in claim 1 wherein the third layer and the fourth layer have equal numbers of turns.

9. The transformer as recited in claim 1 further comprising:

a bobbin of non-magnetic material, and having a tube through which the core extends; and first, second and third walls spaced apart in that order along said tube and each wall extending around said tube;

wherein said primary winding is wound on said bobbin between said first and said second walls, and said secondary winding is wound on said bobbin between said second and said and third walls.

* * * * *